United States Patent
Mueller et al.

(10) Patent No.: US 10,593,458 B2
(45) Date of Patent: Mar. 17, 2020

(54) METHOD FOR ACTUATING AN ELECTROMAGNETIC VALVE, AND CORRESPONDING FLUID SYSTEM

(71) Applicant: Robert Bosch GmbH, Stuttgart (DE)

(72) Inventors: Bjoern-Michael Mueller, Untergruppenbach (DE); Ulrich Blankenhorn, Grossbottwar (DE); Volker Edelmann, Buchen (DE); Manfred Maerz, Ludwigsburg (DE); Andrej Gardt, Abstatt (DE); Valentin Schubitschew, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 15/760,248

(22) PCT Filed: Aug. 30, 2016

(86) PCT No.: PCT/EP2016/070364
§ 371 (c)(1),
(2) Date: Mar. 15, 2018

(87) PCT Pub. No.: WO2017/060008
PCT Pub. Date: Apr. 13, 2017

(65) Prior Publication Data
US 2018/0254134 A1    Sep. 6, 2018

(30) Foreign Application Priority Data
Oct. 8, 2015 (DE) .......... 10 2015 219 506

(51) Int. Cl.
G05B 15/00 (2006.01)
H01F 7/18 (2006.01)
(Continued)

(52) U.S. Cl.
CPC ............. *H01F 7/1805* (2013.01); *B60T 8/00* (2013.01); *B60T 8/17616* (2013.01); *B60T 8/36* (2013.01);
(Continued)

(58) Field of Classification Search
None
See application file for complete search history.

(56) References Cited

U.S. PATENT DOCUMENTS

| 7,589,948 | B2 | 9/2009 | Beyse et al. | |
| 2008/0105789 | A1* | 5/2008 | Smith | B64G 1/401 |
| | | | | 244/171.1 |

(Continued)

FOREIGN PATENT DOCUMENTS

| DE | 40 24 496 A1 | 2/1992 |
| DE | 10 2004 018 191 A1 | 7/2005 |

(Continued)

OTHER PUBLICATIONS

International Search Report corresponding to PCT Application No. PCT/EP2016/070364, dated Dec. 1, 2016 (German and English language document) (5 pages).

*Primary Examiner* — Paul B Yanchus, III
(74) *Attorney, Agent, or Firm* — Maginot, Moore & Beck LLP

(57) ABSTRACT

A method for actuating an electromagnetic valve in a fluid system includes, for a specified first time period, a switching current with a specified first amplitude is applied, the switching current switching the electromagnetic valve from a rest state into a switching state. After the specified first time period expires, a holding current with a specified second amplitude is applied, the holding current holding the electromagnetic valve in the switching state. The first ampli- (Continued)

tude of the first switching current is greater than the second amplitude of the holding current.

8 Claims, 2 Drawing Sheets

(51) Int. Cl.
    *B60T 8/36*         (2006.01)
    *B60T 8/00*         (2006.01)
    *B60T 8/1761*     (2006.01)
    *G05B 15/02*     (2006.01)
    *G05D 7/06*      (2006.01)

(52) U.S. Cl.
    CPC ........... *G05B 15/02* (2013.01); *G05D 7/0635* (2013.01); *H01F 7/18* (2013.01)

(56) References Cited

U.S. PATENT DOCUMENTS

| | | | | |
|---|---|---|---|---|
| 2011/0120559 A1* | 5/2011 | Kaluza | ............... | F01N 3/206 137/1 |
| 2013/0025268 A1* | 1/2013 | Bauer | ............... | F01N 3/208 60/317 |

FOREIGN PATENT DOCUMENTS

| | | |
|---|---|---|
| EP | 0 929 020 A2 | 7/1999 |
| JP | 2004-84753 A | 3/2004 |
| JP | 2008-273338 A | 11/2008 |
| JP | 2011-32922 A | 2/2011 |

\* cited by examiner

METHOD FOR ACTUATING AN ELECTROMAGNETIC VALVE, AND CORRESPONDING FLUID SYSTEM

This application is a 35 U.S.C. § 371 National Stage Application of PCT/EP2016/070364, filed on Aug. 30, 2016, which claims the benefit of priority to Ser. No. DE 10 2015 219 506.6, filed on Oct. 8, 2015 in Germany, the disclosures of which are incorporated herein by reference in their entirety.

The disclosure is based on a method for actuating an electromagnetic valve. The disclosure is based on a fluid system. A fluid system and a computer program for carrying out the method are also the subject matter of the disclosure.

From the prior art, numerous methods for actuating electromagnetic valves, in particular normally closed high pressure switching valves, are known. Such an electromagnetic valve is used as a technical component to control the inlet and/or outlet of fluids, such as for example gases or liquids, or to control and/or to regulate the direction of flow. Typically, a normally closed valve is actuated to open briefly with a high switching current. If the valve is open, the current can reduce to a lower holding current, because a larger magnetic force acts for the same current because of a smaller residual air gap. Electromagnetic valves, in particular electromagnetic valves with gap filtering, can comprise a temperature-dependent functional behavior, so that under adverse boundary conditions problems with the switching behavior can occur.

From DE 10 2004 018 191 A1, a method for actuating a two-stage switching valve is known. The switching valve comprises a first stage with a small throughflow cross-section and a second stage with a larger throughflow cross-section and is disposed in a hydraulic brake system between a master brake cylinder and a hydraulic pump. The impact of pressure equalization can be reduced if the switching valve is actuated in a first phase with a control signal with a small amplitude in order to only open the pilot stage of the switching valve for a specified period of time, and the switching valve is actuated in a second phase with a control signal with a larger amplitude in order to ensure that the main stage of the valve is fully open. The opening behavior of the valve is as a rule highly voltage-dependent and temperature-dependent, therefore the actuation signal for the valve is preferably voltage-compensated and/or temperature-compensated. The voltage that is actually applied to the valve can for example be measured and the coil temperature can be estimated. After a further period of time, the signal amplitude is returned to a lower value that is sufficient to hold the valve open and to prevent overheating of the valve.

Summary

The method for actuating an electromagnetic valve and the fluid system with the features disclosed herein have the advantage that a guarantee of valve function over the entire temperature range of the fluid used is possible by means of the suitable actuation or energization of the electromagnetic valve. This applies to both fast switching and normal switching of the electromagnetic valve.

At the core of the disclosure is a temperature-dependent electrical current profile for switching or for holding the switching state of the valve. This means that the switching current and the holding current of the electromagnetic valve are specified as a function of at least one piece of temperature information. Electromagnetic valves can in particular have a temperature-dependent switching behavior because of the fluid viscosity. Specifically, this means that at low temperatures and high fluid viscosity, because of pressure drops in the electromagnetic valve different force equilibria can occur than at high temperatures. Thus, as typical forces for a normally closed electromagnetic valve, the magnetic force of an electromagnetic assembly occurs as an opening force, and the spring force of a restoring spring, hydraulic forces and additional temperature-dependent hydraulic forces owing to viscous pressure drops occur as closing forces. In this case, the closing forces are greater at high viscosity, so that a higher switching current is necessary for opening the valve in the cold. At high fluid temperatures and ambient temperatures and with long energization times at the same time, said high electrical currents can result in impermissibly high component temperatures in the electromagnetic assembly and in a driver circuit of an analysis and control unit and can destroy the unit. Therefore, the high currents should only be produced at low temperatures. At high temperatures, the viscous effect is very low, so that the amplitude of the switching current and the amplitude of the holding current can be reduced to protect the components against overheating.

Thus, at low temperatures a large amplitude of the switching current and a large amplitude of the holding current can be specified, so that the electromagnetic valve switches or remains switched. At high temperatures, a smaller amplitude of the switching current and a smaller amplitude of the holding current can be specified, so that the electromagnetic valve switches or remains switched and the components are not overheated. Thus, for example a first current characteristic curve with a first amplitude of the switching current and a first amplitude of the holding current can be specified for an upper temperature limit value, and a second current characteristic curve with a second amplitude of the switching current and a second amplitude of the holding current can be specified for a lower temperature limit value. The temperature limit values for distinguishing between low or high energization can either be determined or measured by means of computer models, resistance measurements or temperature sensors. More than the two temperature limit values can be distinguished, for example, in order to achieve finer graduation. By using a plurality of temperature ranges, yet more optimal energization of the electromagnetic valve can advantageously be achieved, i.e. so that the amplitude of the switching current and the amplitude of the holding current can be chosen to be just as large as is required for switching and holding the electromagnetic valve. If the temperature detection is very accurate, the current demand can even be interpolated across temperature-dependent current reference points.

Embodiments of the disclosure advantageously enable the valve functions to be guaranteed over the entire temperature range without adversely affecting the service life of the components. Thus, the physical effect can also be used that a much greater current can be produced for the same voltage at low temperatures because of the lower ohmic resistances.

Embodiments the present disclosure provide a method for actuating an electromagnetic valve in a fluid system. In this case, a switching current with a specified first amplitude that switches the electromagnetic valve from a rest state into a switched state is applied for a specified first period of time. Following the expiry of the specified first period of time, a holding current with a specified second amplitude is applied, which holds the electromagnetic valve in the switched state, wherein the first amplitude of the switching current is greater than the second amplitude of the holding current. In this case, the first amplitude of the switching current and the second amplitude of the holding current are specified depending on at least one piece of temperature information.

Furthermore, a fluid system with at least one electromagnetic valve and an analysis and control unit are proposed, which applies a switching current with a specified first amplitude to the electromagnetic valve for a specified first period of time, which switches the electromagnetic valve from a rest state into a switched state. Following the expiry of the specified first period of time, the analysis and control unit applies a holding current with a specified second amplitude to the electromagnetic valve that holds the electromagnetic valve in the switched state, wherein the first amplitude of the switching current is greater than the second amplitude of the holding current. In this case, the analysis and control unit specifies the first amplitude of the switching current and the second amplitude of the holding current depending on at least one piece of temperature information.

In the present case, the analysis and control unit can be an electrical unit, such as for example a control unit, in particular a control unit for a vehicle brake system with ABS and/or ESP functionality, which processes or analyses detected sensor signals. The analysis and control unit can comprise at least one interface that can be embodied in hardware and/or software. In the case of a hardware embodiment, the interfaces can for example be part of a so-called system ASIC containing diverse functions of the analysis and control unit. It is however also possible that the interfaces are dedicated integrated circuits or consist at least partly of discrete components. In the case of a software embodiment, the interfaces can be software modules, which for example are provided on a microcontroller alongside other software modules. Of advantage is also a computer program with program code that is stored on a machine-readable memory medium, such as a semiconducting memory, a hard disk or an optical memory, and that is used for carrying out the method for actuating an electromagnetic valve when the program is run by the analysis and control unit.

In the present case, a sensor unit means a unit that comprises at least one sensor element that detects a physical variable or a change in a physical variable directly or indirectly and preferably converts it into an electrical sensor signal.

Owing to the measures and developments mentioned herein, advantageous improvements of the method specified herein for actuating an electromagnetic valve and the fluid system specified herein are possible.

It is particularly advantageous that the first period of time of the switching current can be specified as a function of at least one piece of temperature information.

Thus, the first period of time can be specified to be longer for low temperatures and high fluid viscosity than for high temperatures and low fluid viscosity. This means that the electromagnetic valve is actuated for a longer time with the amplitude of the switching current. At high temperatures, the viscous influence is very small, so that the first period of time is reduced to protect the components against overheating and the electromagnetic valve is actuated with the amplitude of the switching current for a shorter time.

In an advantageous embodiment of the method according to the disclosure, the at least one piece of temperature information can contain for example information about a fluid temperature in the fluid system and/or information about an ambient temperature and/or information about a drive unit temperature and/or information about a component temperature. Said information can be provided to the analysis and control unit by means of a temperature sensor and/or by means of a bus system from other vehicle assemblies, for example.

In another advantageous embodiment of the method according to the disclosure, the switching current can be rapidly increased from an initial value to the first amplitude. As a result, dynamic actuation of the electromagnetic valve can be implemented, which enables rapid switching of the electromagnetic valve. Alternatively, the switching current can be increased in stages from an initial value to the first amplitude.

An exemplary embodiment of the disclosure is represented in the drawing and is described in detail in the following description. In the drawing, the same reference characters refer to components or elements that implement the same or similar functions.

DETAILED DESCRIPTION

Figure 1:
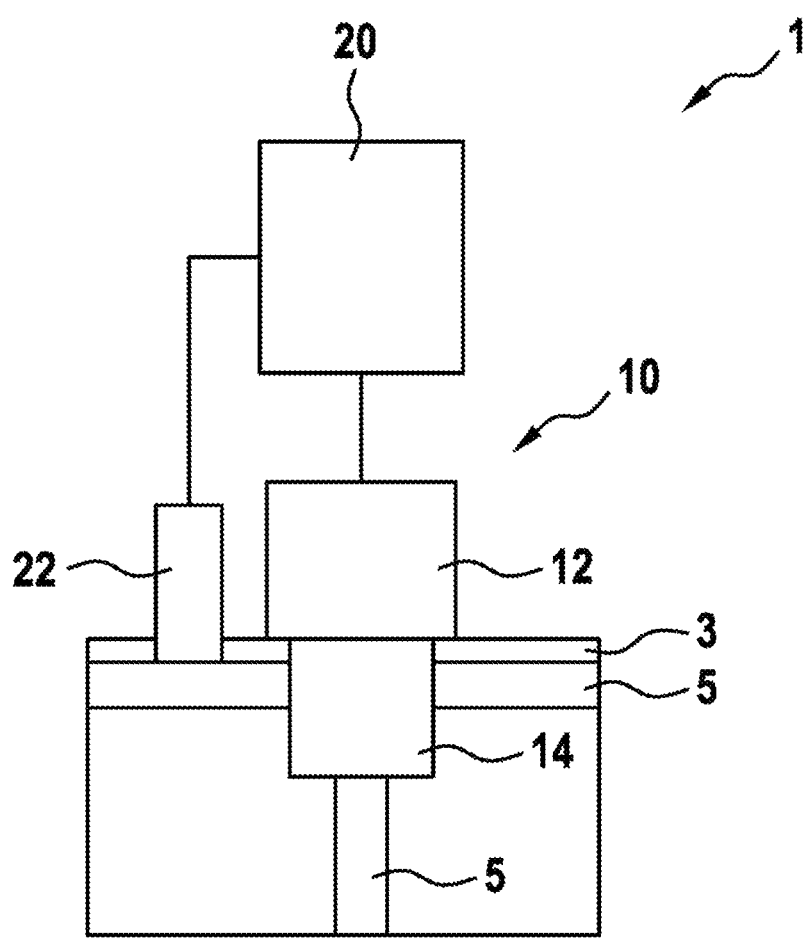
FIG. 1 shows a schematic sectional representation of a section of an exemplary embodiment of a fluid system according to the disclosure.

As can be seen in FIG. 1, the represented exemplary embodiment of a fluid system according to the disclosure 1 comprises at least one electromagnetic valve 10 and an analysis and control unit 20. The section of the fluid system 1 that is represented shows by way of example an electromagnetic valve 10 with a magnet assembly 12 and a valve cartridge 14, which in the represented exemplary embodiment is screwed into a fluid block 3 that comprises a plurality of fluid channels 5. Furthermore, in the exemplary embodiment that is represented a temperature sensor 22 is screwed into the fluid block 3 that measures a fluid temperature and provides information about the fluid temperature to the analysis and control unit 20 as at least one piece of temperature information. Furthermore, further temperature sensors and/or vehicle systems that are not represented can be used that provide the analysis and control unit 20 with further temperature information, such as for example information about an ambient temperature and/or information about a drive unit temperature and/or information about a component temperature of the magnet assembly 12 or a driver circuit that produces and outputs the current for actuation of the electromagnetic valve 10.

Figure 2:
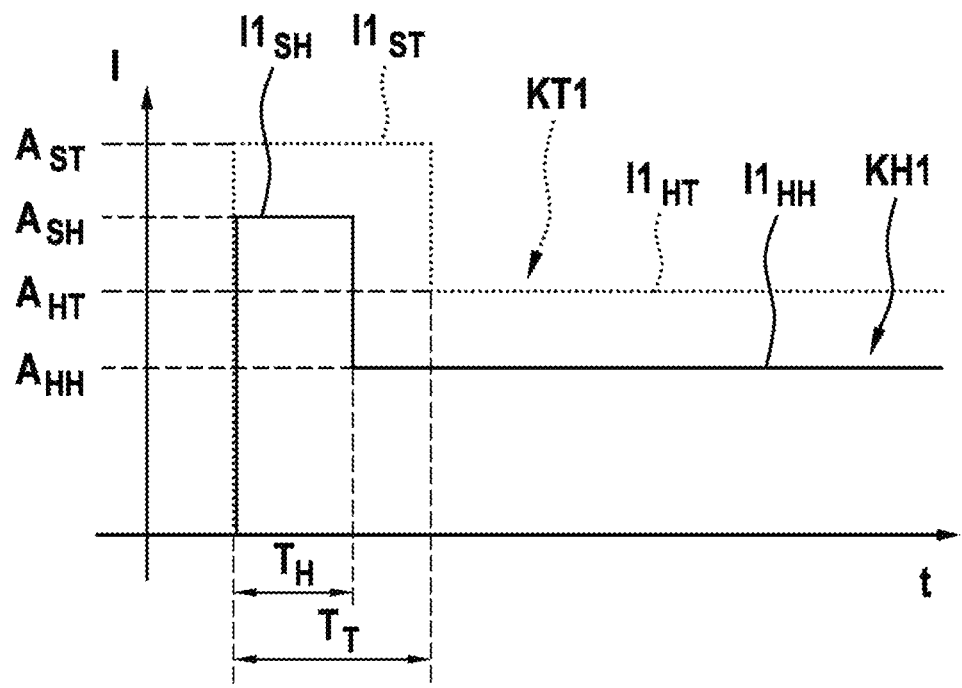
FIG. 2 shows a schematic characteristic curve diagram with two temperature-dependent current characteristic curves that are produced by an exemplary embodiment of a method according to the disclosure for actuating an electromagnetic valve of the fluid system according to the disclosure of FIG. 1.
Figure 3:
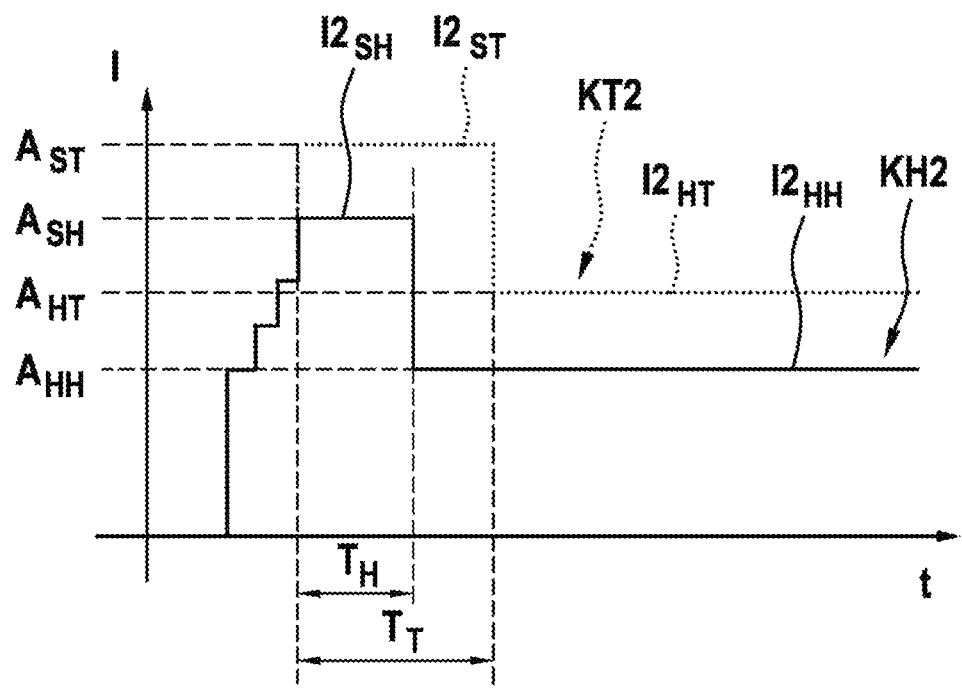
FIG. 3 shows a schematic characteristic curve diagram with two further temperature-dependent current characteristic curves that are produced by an exemplary embodiment of a method according to the disclosure for actuating an electromagnetic valve of the fluid system according to the disclosure of FIG. 1.

As can be further seen from FIGS. 1 through 3, the analysis and control unit 20 applies a switching current $I1_{SH}$, $I2_{SH}$, $I1_{ST}$, $I2_{ST}$ with a specified first amplitude $A_{SH}$, $A_{ST}$ to the electromagnetic valve 10 for a specified first period of time $T_H$, $T_T$. The switching current $I1_{SH}$, $I2_{SH}$, $I1_{ST}$, $I2_{ST}$ switches the electromagnetic valve 10 from a rest state into a switched state. Following the expiry of the expiry of the specified first period of time $T_H$, $T_T$, the analysis and control unit 20 applies a holding current $I1_{HH}$, $I2_{HH}$, $I1_{HT}$, $I2_{HT}$ with a specified second amplitude $A_{HH}$, $A_{HT}$ to the electromagnetic valve 10. The holding current $I1_{HH}$, $I2_{HH}$, $I1_{HT}$, $I2_{HT}$ holds the electromagnetic valve 10 in the switched state. As can further be seen from FIGS. 2 and 3, the first amplitude $A_{SH}$, $A_{ST}$ of the switching current $I1_{SH}$, $I2_{SH}$, $I1_{ST}$, $I2_{ST}$ is greater than the second amplitude $A_{HH}$, $A_{HT}$ of the holding current $I1_{HH}$, $I2_{HH}$, $I1_{HT}$, $I2_{HT}$. The analysis and control unit 20 specifies the first amplitude $A_{SH}$, $A_{ST}$ of the switching current $I1_{SH}$, $I2_{SH}$, $I1_{ST}$, $I2_{ST}$ and the second amplitude $A_{HH}$, $A_{HT}$ of the holding current $I1_{HH}$, $I2_{HH}$, $I1_{HT}$, $I2_{HT}$ as a function of at least one piece of temperature information.

As can further be seen from FIGS. 2 and 3, the analysis and control unit 20 in the exemplary embodiment that is represented also specifies the first period of time $T_H$, $T_T$ of the switching current $I1_{SH}$, $I2_{SH}$, $I1_{ST}$, $I2_{ST}$ as a function of the at least one piece of temperature information.

The fluid system 1 can for example be embodied as an ABS/TCS/ESP system, wherein the electromagnetic valve 10 can in particular be embodied as a normally closed high-pressure switching valve. The electromagnetic valve 10 is used as a technical component to control the inlet or outlet of gases or liquids or to control or to regulate the direction of flow. Typically, a normally closed valve is actuated to open briefly with the high switching current $I1_{SH}$, $I2_{SH}$, $I1_{ST}$, $I2_{ST}$. If the valve is open, the switching current $I1_{SH}$, $I2_{SH}$, $I1_{ST}$, $I2_{ST}$ can be reduced to the holding current $I1_{HH}$, $I2_{HH}$, $I1_{HT}$, $I2_{HT}$ because of the smaller residual air gap. With the known actuation methods, two different types of actuation are represented depending on the dynamic requirement. For dynamic actuation, the switching current $I1_{SH}$, $I1_{ST}$ is rapidly increased, for normal actuation the switching current $I2_{SH}$, $I2_{ST}$ is increased in stages. The amplitude of the switching current $I1_{SH}$, $I2_{SH}$, $I1_{ST}$, $I2_{ST}$ is the same in both cases.

As can further be seen from FIG. 2, at high temperatures according to the represented solid first current characteristic curve KH1, for a specified first period of time $T_H$, a first switching current $I1_{SH}$ is applied rapidly with a specified first amplitude $A_{SH}$, which rapidly switches the electromagnetic valve 10 from a rest state, which corresponds in the represented exemplary embodiment to a current value of 0 A, into a switched state, which corresponds to the first amplitude $A_{SH}$ of the switching current $I1_{SH}$. Following the expiry of the specified first period of time $T_H$, a first holding current $I1_{HH}$ with a specified second amplitude $A_{HH}$ is applied, which holds the electromagnetic valve 10 in the switched state. As can further be seen from FIG. 2, the first amplitude $A_{SH}$ of the first switching current $I1_{SH}$ is greater than the second amplitude $A_{HH}$ of the first holding current $I1_{HH}$.

As can further be seen from FIG. 2, at low temperatures according to the represented dotted second current characteristic curve KT1, for a specified first period of time $T_T$, which in the represented exemplary embodiment is longer than the first period of time $T_H$ at high temperatures, a first switching current $I1_{ST}$ is applied rapidly with a specified first amplitude $A_{ST}$, which is greater than the first amplitude $A_{SH}$ at high temperatures. Owing to the higher first switching current $I1_{ST}$, the electromagnetic valve 10 is also switched rapidly at low temperatures from the rest state into the switched state, which corresponds to the first amplitude $A_{ST}$ of the first switching current $I1_{ST}$ at low temperatures. Following the expiry of the specified longer first period of time $T_T$, a first holding current $I1_{HT}$ is applied with a specified second amplitude $A_{HT}$, which is greater than the second amplitude $A_{ST}$ at high temperatures. Owing to the higher first holding current $I1_{HT}$, the electromagnetic valve 10 is also held in the switched state at low temperatures. As can further be seen from FIG. 2, the first amplitude $A_{ST}$ of the first switching current $I1_{ST}$ is also greater than the second amplitude $A_{HT}$ of the first holding current $I1_{HT}$ at lower temperatures.

As can further be seen from FIG. 3, at high temperatures according to the represented solid second current characteristic curve KH2, a second switching current $I2_{SH}$ with a specified first amplitude $A_{SH}$ is applied to the electromagnetic valve 10 for a specified first period of time $T_H$. In contrast to the current characteristic curves KH1, KT1 of FIG. 2, which rapidly rise from an initial current value of 0 A to the first amplitude $A_{SH}$ of the switching current $I1_{SH}$, the current characteristic curves KH2, KT2 of FIG. 3 rise in stages from the initial current value of 0 A to the first amplitude $A_{SH}$ of the switching current $I1_{SH}$, wherein three intermediate stages are provided in the represented exemplary embodiment. As a result, the electromagnetic valve 10 is switched more slowly from the rest state, which corresponds to a current value of 0 A in the represented exemplary embodiment, into a switched state, which corresponds to the first amplitude $A_{SH}$ of the second switching current $I2_{SH}$. Following the expiry of the specified first period of time $T_H$, a second holding current $I2_{HH}$ with a specified second amplitude $A_{HH}$ is applied, which holds the electromagnetic valve 10 in the switched state. As can further be seen from FIG. 3, the first amplitude $A_{SH}$ of the second switching current $I2_{SH}$ is greater than the second amplitude $A_{HH}$ of the second holding current $I2_{HH}$.

As can further be seen from FIG. 3, similarly to FIG. 2 at low temperatures according to the represented dotted second current characteristic curve KT2, a second switching current $I2_{ST}$ with a specified first amplitude $A_{ST}$, which is greater than the first amplitude $A_{SH}$ at high temperatures, is applied for a specified first period of time $T_T$, which in the represented exemplary embodiment is longer than the first period of time $T_H$ at high temperatures. Owing to the higher second switching current $I2_{ST}$, the electromagnetic valve 10 is also switched at low temperatures from the rest state into the switched state, which corresponds to the first amplitude $A_{ST}$ of the second switching current $I2_{ST}$ at low temperatures. Following the expiry of the specified longer first period of time $T_T$, a second holding current $I2_{HT}$ is applied with a specified second amplitude $A_{HT}$, which is greater than the second amplitude $A_{ST}$ at high temperatures. Owing to the higher second holding current $I2_{HT}$, the electromagnetic valve 10 is also held in the switched state at low temperatures. As can further be seen from FIG. 3, the first amplitude $A_{ST}$ of the second switching current $I2_{ST}$ is also greater at lower temperatures than the second amplitude $A_{HT}$ of the second holding current $I2_{HT}$.

Thus, in the case of the described exemplary embodiments, the first amplitude $A_{SH}$, $A_{ST}$ of the switching current $I1_{SH}$, $I2_{SH}$, $I1_{ST}$, $I2_{ST}$ and the second amplitude $A_{HH}$, $A_{HT}$ of the holding current $I1_{HH}$, $I2_{HH}$, $I1_{HT}$, $I2_{HT}$ are specified as a function of at least one piece of temperature information. Furthermore, with the described exemplary embodiments the first period of time $T_H$, $T_T$ of the switching current $I1_{SH}$, $I2_{SH}$, $I1_{ST}$, $I2_{ST}$ is specified as a function of at least one piece of temperature information. The at least one piece of temperature information comprises for example information about a fluid temperature in the fluid system 1 and/or information about an ambient temperature and/or information about a drive unit temperature and/or information about a component temperature.

In the case of the represented exemplary embodiment, two temperature limit values are specified for distinguishing between low and high energization, which can either be determined or measured by means of computer models, resistance measurements or temperature sensors. Of course, more than the two temperature limit values can also be distinguished between in order to achieve a finer graduation. By using a plurality of temperature ranges, advantageously a yet more optimal energization of the electromagnetic valve 10 can be achieved, i.e. so that the amplitude of the switching current $A_{SH}$, $A_{ST}$ and the holding current amplitude $A_{HH}$, $A_{AT}$ is selected to be just large enough as is required for switching and holding the electromagnetic valve 10. If the temperature detection is very accurate, the current specifications can even be interpolated across temperature-dependent current reference points.

Embodiments of the present disclosure provide a method for actuating an electromagnetic valve in a fluid system, which advantageously enables the valve function over the entire temperature range by means of suitable actuation or energization without adversely affecting the service life of the components. The core of the disclosure is a temperature-dependent electrical current profile for switching and holding the valve.

The invention claimed is:

1. A method for actuating an electromagnetic valve in a fluid system, comprising:
    applying, for a specified first period of time, a switching current with a specified first amplitude, which switches the electromagnetic valve from a rest state into a switched state;
    applying a holding current, following an expiry of the specified first period of time, with a specified second amplitude, which holds the electromagnetic valve in the switched state, wherein the first amplitude of the switching current is greater than the second amplitude of the holding current; and
    specifying the first amplitude of the switching current and the second amplitude of the holding current as a function of at least one piece of temperature information that identifies a low fluid temperature or a high fluid temperature,
    wherein, prior to the first period of time, the switching current is increased from an initial value, to the second amplitude that is greater than the initial value, to a first stage value greater than the second amplitude, to a second stage value greater than the first stage value, and to the first amplitude that is greater than the second stage value, and
    wherein, following the expiry of the first period of time when the high fluid temperature is identified, the switching current is decreased from the first amplitude directly to the second amplitude to apply the holding current.

2. The method as claimed in claim 1, further comprising:
    specifying the first period of time of the switching current as a function of the at least one piece of temperature information,
    wherein at the high fluid temperature the first period of time has a first duration, and
    wherein at the low fluid temperature the first period of time has a second duration that is longer than the first duration.

3. The method as claimed in claim 1, wherein the at least one piece of temperature information further comprises information about an ambient temperature and/or information about a drive unit temperature and/or information about a component temperature.

4. The method as claimed in claim 1, further comprising:
    specifying each of the first amplitude of the switching current and the second amplitude of the holding current with higher values for the low fluid temperature than for the high fluid temperature,
    wherein following the expiry of the first period of time and for the low fluid temperature, the switching current is decreased from the first amplitude directly to a holding amplitude to apply the holding current, and
    wherein the holding amplitude is greater than the first stage value and less than the second stage value.

5. The method as claimed in claim 1, further comprising:
    increasing rapidly the switching current from the initial value to the first amplitude.

6. The method as claimed in claim 1, wherein a computer program is configured to carry out the method.

7. The method as claimed in claim 6, wherein the computer program is stored on a machine-readable memory medium.

8. A fluid system comprising:
    at least one electromagnetic valve;
    at least one temperature sensor configured to provide at least one piece of temperature information about a fluid temperature in the fluid system, the at least one piece of temperature information includes identification of a high fluid temperature and a low fluid temperature; and
    an analysis and control unit configured to apply, for a specified first period of time, a switching current with a specified first amplitude to the at least one electromagnetic valve, which switches the at least one electromagnetic valve from a rest state into a switched state,
    wherein following an expiry of the specified first period of time, the analysis and control unit is further configured to apply a holding current with a specified second amplitude to the at least one electromagnetic valve, which holds the at least one electromagnetic valve in the switched state,
    wherein the first amplitude of the switching current is greater than the second amplitude of the holding current,
    wherein the analysis and control unit is further configured to specify the first amplitude of the switching current and the second amplitude of the holding current as a function of the at least one piece of temperature information,
    wherein, prior to the first period of time, the analysis and control unit increases the switching current from an initial value, to the second amplitude that is greater than the initial value, to a first stage value greater than the second amplitude, to a second stage value greater than the first stage value, and to the first amplitude that is greater than the second stage value, and
    wherein, following the expiry of the first period of time and when the high fluid temperature is identified, the analysis and control unit decreases the switching current from the first amplitude directly to the second amplitude to apply the holding current.

* * * * *